US010183522B2

United States Patent
Trassl et al.

(10) Patent No.: US 10,183,522 B2
(45) Date of Patent: Jan. 22, 2019

(54) SECURITY ELEMENT AND METHOD FOR PRODUCING A SECURITY ELEMENT HAVING LIGHT-SCATTERING STRUCTURES

(71) Applicants: HUECK FOLIEN GES.M.B.H., Baumgartenberg (AT); Joanneum Research Forschungsgesellschaft mbH, Graz (AT)

(72) Inventors: Stefan Trassl, Baumgartenberg (AT); Klaus Schmidegg, Linz (AT); Maria Belegratis, Pischelsdorf (AT); Volker Schmidt, Pischelsdorf (AT); Michael Steindorfer, Stattegg (AT); Barbara Stadlober, Graz (AT)

(73) Assignees: HUECK FOLIEN GES.M.B.H., Baumgartenberg (AT); JOANNEUM RESEARCH FORSCHUNGSGESELLSCHAFT MBH, Graz (AT)

( * ) Notice: Subject to any disclaimer, the term of this patent is extended or adjusted under 35 U.S.C. 154(b) by 0 days.

(21) Appl. No.: 15/309,314

(22) PCT Filed: May 11, 2015

(86) PCT No.: PCT/EP2015/000970
§ 371 (c)(1),
(2) Date: Nov. 7, 2016

(87) PCT Pub. No.: WO2015/188908
PCT Pub. Date: Dec. 17, 2015

(65) Prior Publication Data
US 2017/0072733 A1 Mar. 16, 2017

(30) Foreign Application Priority Data
Jun. 10, 2014 (AT) .................................. A 454/2014

(51) Int. Cl.
*B42D 15/00* (2006.01)
*B42D 25/328* (2014.01)
(Continued)

(52) U.S. Cl.
CPC .......... *B42D 25/328* (2014.10); *B29C 59/022* (2013.01); *B42D 25/36* (2014.10);
(Continued)

(58) Field of Classification Search
CPC ...... B42D 25/29; B42D 25/328; B42D 25/00; B42D 25/324; B42D 2035/20; B42D 2033/20
See application file for complete search history.

(56) References Cited

U.S. PATENT DOCUMENTS 7,659,851 B2 * 2/2010 DeJean ................. H01Q 1/243
343/700 MS
7,751,608 B2 * 7/2010 Hersch ................ B42D 25/342
283/94
(Continued)

FOREIGN PATENT DOCUMENTS

DE 10 2007 020 982 10/2008
EP 2 508 922 10/2012
(Continued)

OTHER PUBLICATIONS

International Search Report dated Oct. 28, 2015 in International Application No. PCT/EP2015/000970.
(Continued)

*Primary Examiner* — Shin H Kim
(74) *Attorney, Agent, or Firm* — Wenderoth, Lind & Ponack, L.L.P.

(57) ABSTRACT

The invention relates to a security element, comprising a thermoplastic or photo-sensitive replication lacquer layer, non-periodic randomly arranged (randomized) structures in
(Continued)

Figure 1:
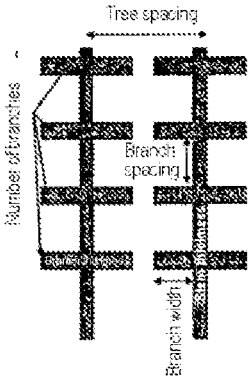

Tree parameterization   Color   Parameter values blue
Tree spacing : 300nm,
Branch spacing : 225nm,
Branch width : 155nm, Branch thickness : 140nm,
Number of branches : 5, Stem thickness : 155nm green
Tree spacing : 240nm,
Branch spacing : 225nm,
Branch width : 205nm, Branch thickness : 185nm,
Number of branches : 5, Stem thickness : 210nm red
Tree spacing : 455nm
Branch spacing : 160nm,
Branch width : 460nm, Branch thickness : 150nm,
Number of branches : 7, Stem thickness : 170nm the sub-micrometer range being incorporated into the replication lacquer layer and having an angle-independent optical effect, such as a color effect, and to a method for the production thereof and to the use thereof.

12 Claims, 4 Drawing Sheets

(51) Int. Cl.
G02B 5/02 (2006.01)
G02B 5/18 (2006.01)
B42D 25/36 (2014.01)
B42D 25/41 (2014.01)
B42D 25/425 (2014.01)
B29C 59/02 (2006.01)
G02B 5/00 (2006.01)
B29K 101/12 (2006.01)

(52) U.S. Cl.
CPC ........... *B42D 25/41* (2014.10); *B42D 25/425* (2014.10); *G02B 5/003* (2013.01); *G02B 5/0252* (2013.01); *G02B 5/0284* (2013.01); *G02B 5/0294* (2013.01); *G02B 5/1861* (2013.01); *B29C 2059/023* (2013.01); *B29K 2101/12* (2013.01)

(56) References Cited

U.S. PATENT DOCUMENTS

| | | | | |
|---|---|---|---|---|
| 8,211,531 B2* | 7/2012 | Schmid | ............... | B42D 25/29 283/110 |
| 8,257,819 B2* | 9/2012 | Tompkin | ............... | B42D 25/29 283/72 |
| 8,708,241 B2* | 4/2014 | DeJean | ............... | H01Q 1/243 235/492 |
| 2005/0104365 A1* | 5/2005 | Haas | ............... | B29C 44/22 283/72 |
| 2006/0018021 A1* | 1/2006 | Tomkins | ............... | G02B 5/1857 359/573 |
| 2007/0159400 A1* | 7/2007 | DeJean | ............... | H01Q 1/243 343/700 MS |
| 2010/0127823 A1* | 5/2010 | DeJean | ............... | H01Q 1/243 340/5.8 |
| 2010/0264642 A1* | 10/2010 | Rosset | ............... | D21F 1/44 283/70 |
| 2011/0031735 A1* | 2/2011 | Gerigk | ............... | B42D 25/29 283/70 |
| 2012/0236415 A1 | 9/2012 | Nagano et al. | | |
| 2012/0301639 A1* | 11/2012 | Grigorenko | ............... | B41M 3/148 428/29 |
| 2012/0319395 A1* | 12/2012 | Fuhse | ............... | G02B 5/1842 283/67 |
| 2013/0285361 A1* | 10/2013 | Staub | ............... | B42D 25/00 283/85 |
| 2015/0042084 A1* | 2/2015 | Staub | ............... | B42D 25/445 283/91 |
| 2015/0158323 A1* | 6/2015 | Richert | ............... | B42D 25/30 283/85 |
| 2015/0192897 A1* | 7/2015 | Schilling | ............... | G03H 1/0244 359/2 |
| 2016/0116645 A1* | 4/2016 | Parker | ............... | B05D 5/061 359/599 |
| 2017/0072733 A1* | 3/2017 | Trassl | ............... | G02B 5/0252 |

FOREIGN PATENT DOCUMENTS

| | | |
|---|---|---|
| WO | 2006/007742 | 1/2006 |
| WO | 2011/161482 | 12/2011 |
| WO | 2014/001283 | 1/2014 |

OTHER PUBLICATIONS

Alexander B. Christiansen et al., "Imprinted and injection-molded nano-structured optical surfaces", Proceedings of SPIE, vol. 8818, Sep. 19, 2013, p. 881803, XP055099258.

Shao-Hui Kang et al., "Replication of butterfly wing microstructures using molding lithography", Current Applied Physics, North-Holland, Amsterdam, NL, vol. 10, No. 2, Mar. 1, 2010, pp. 625-630, XP0267005.

* cited by examiner

SECURITY ELEMENT AND METHOD FOR PRODUCING A SECURITY ELEMENT HAVING LIGHT-SCATTERING STRUCTURES

The invention relates to security elements having non-ordered light-scattering structures which exhibit angle-independent optical color effects, and also to methods for the production thereof.

Security elements which have a feature with an optical color effect are produced either via the embossing of a surface structure (relief) and/or via the printing of colored pigments. The optical effects produced by embossing are generally diffractive effects of periodic (or non-periodic) structures. Such structures can produce direction-dependent impressions of colors, depending on the wavelength of the incident light.

DE 102007020982 A1 discloses a method and security label for the visual identification of an original product. Here, a unique random micro-arrangement of randomly surface-distributed micro-arrangement elements with a characteristic shape is provided on the product to be identified. The arrangements described exhibit no color effects.

WO 2006/007742 A1 describes an anisotropic optical feature of a non-periodic light-scattering structure which creates a color change when the viewing angle is changed.

The object of the invention was to provide a security element and a method for the production thereof which exhibits an angle-independent optical color effect on the basis of omni-directional light scattering on structures in the sub-micrometer range (structural colors).

The subject of the invention is therefore a security element having a thermoplastic or photosensitive layer, characterized in that non-periodic randomly arranged (randomized) structures in the sub-micrometer range are incorporated into a surface of the layer, and produce an angle-independent optical effect such as a color effect.

Security features having an angle-independent color effect based on non-periodic randomly arranged (randomized) structures exhibit increased security against forgery.

As compared with the known optical effects, which are produced by diffractive, periodic structures, these non-periodic, randomly arranged (randomized) structures have the advantage that the security feature can be copied only via the accurate knowledge of the structure and the arrangement thereof.

A further advantage resides in the angle-independence of the optical effect, which is very easy to identify as authentic as a result.

Further, there is the possibility, via the arrangement of the non-periodic structures, of producing both color effects and also matt-white or, if appropriate in combination with an absorber, also matt-black effects.

As a result, via the spatial variation of the non-periodic structures, a locally resolved color chart can be produced and therefore—on account of the high resolution during the production process of the non-periodic structures—letters, numbers, patterns, etc can be reproduced with the highest resolution in a range from 1 to 10 µm.

The security feature exhibits an angle-independent optical effect based on non-periodic structures in the sub-micrometer range.

The non-periodic structures in the sub-micrometer range typically have structural details which are crucial for the color in the range <1 µm, preferably <500 nm.

The form of the structures in the simplest case is an ellipsoid.

Furthermore, the structures can be formed more complexly and can be present as easily undercut structures, such as small tree structures, comb structures, fan structures or the like. These structures will be designated as light-scattering structures (LS) further below.

The optical effect caused by randomizing the LS conveys an impression of color that is diffuse but uniform over a large range of viewing angles, for example white, green, red, blue, yellow, purple and the like.

The arrangement of the LS responsible for the impression of color exhibits a high degree of randomness and is an individual feature of a safeguard against forgery. In addition, the impression of color is more resistant than that of pigments and does not fade.

The impression of color can be changed during production by the arrangement of the structural elements which produce said impression being adapted. If the structure is destroyed, the impression of color also vanishes or changes.

Parameterized models of the color-imparting structures are examined with the aid of wave-optical finite-difference-time-domain (FDTD) simulations. Typical parameters using the example of the structures inspired by the Morpho peleides butterfly (here designated generally as small trees) are, for example, the spacing between the individual structural units, the spacing, angle and thickness of the sub-structures. The correlation obtained in this way between structural characteristics (geometry and material characteristics such as complex refractive index) and spectral reflective behavior permits the definition of a structural geometry for a desired impression of color. In addition, the simultaneous optimization of the many geometric parameters of the 3D structure permits intensification of a specific color with the simultaneous suppression of other spectral ranges, such as a complementary color, so that relatively narrow and defined reflection bands are possible. The spectral reflectivity is entered in the CIE diagram by using a color coordinate and correlates the structure with the corresponding color. In FIG. 1, the parameters for a blue, green and red impression of color are specified as examples.

Figure 2:
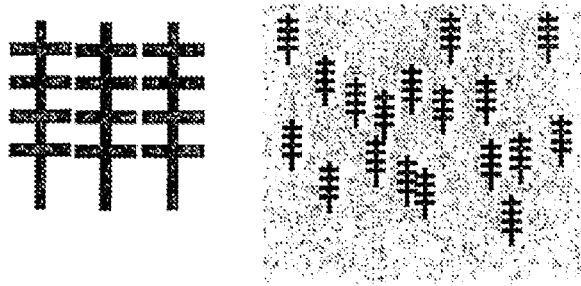

The sub-structure, ordered in the manner of lamellae, is responsible for the impression of color on account of constructive interference of the reflected light. The spacing and the number of the individual lamellar sub-structures influence the level of reflection for a specific wavelength. Given a regular arrangement of identical small tree structures, typical lattice effects of more regularly ordered structures are again manifested. By means of randomization, that is to say the random arrangement of individual small tree structures in relation to one another, the lattice effects are canceled and diffuse angle-independent impressions of color are produced as a result of the interaction of interference, diffraction and non-coherent light scattering between the randomly arranged tree structures (FIG. 2).

Figures 3, 4:
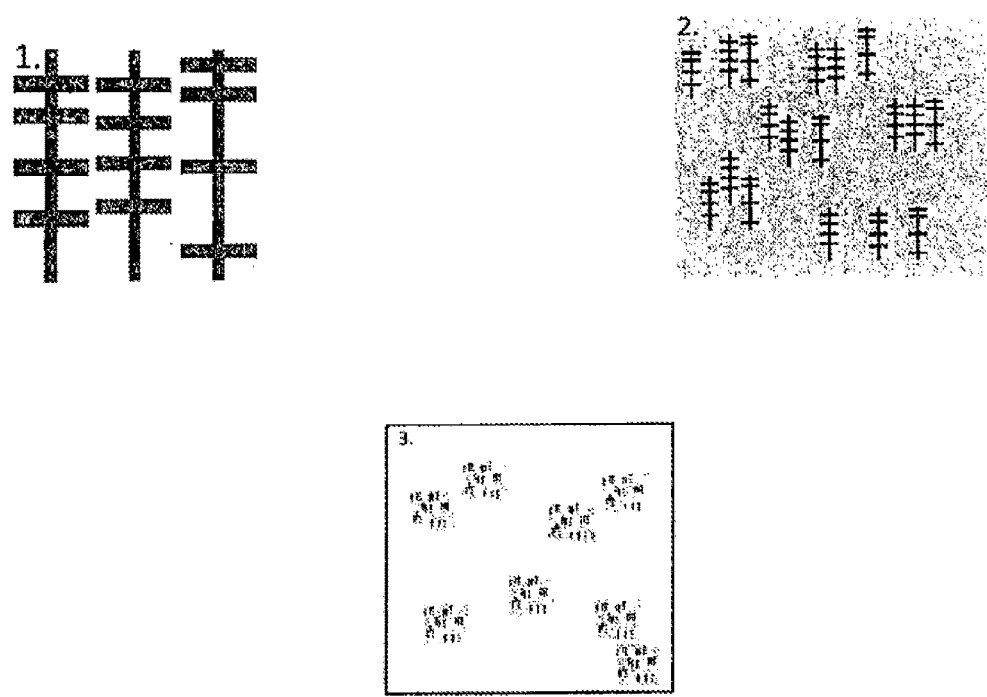
Figure 5:
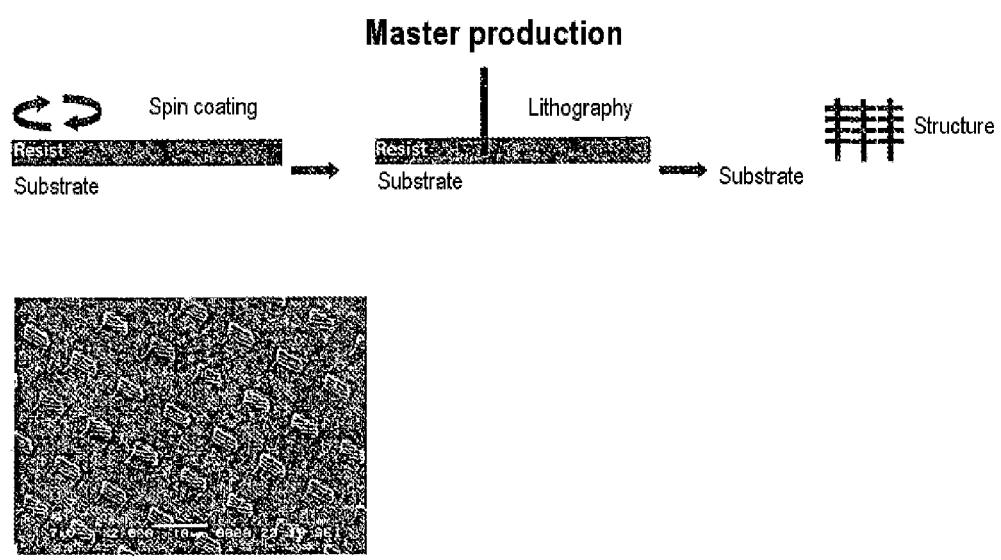

Besides complex 3D structures, simple structures having a multi-layer system comprising alternating high-index and low-index materials are also produced in accordance with the same method. The color is produced by the geometry of the structures and the structure of the layer system (FIG. 3).

Since virtually any desired multiplicity of random arrangements of the LS causes a diffuse impression of color, a randomly generated original structure, with which the authenticity can be checked, can be archived for each security feature.

As opposed to pigment-based or molecular colorants, so-called structural colors are produced by wave-optical phenomena such as interference, diffraction and light scattering on structural or geometric arrangements of materials having different optical properties. In order to give rise to an impression of color, the dimensions of these geometric arrangements must be of the order of magnitude of the wavelength of light in the visible spectral range.

The resultant impression of color of the color-imparting structures is influenced by the optical properties of the thermoplastic or photosensitive layer and/or adjacent layers. In combination with dark colored pigments (e.g. melanin, carbon black or the like) or light-absorbing layers, the color effect can be intensified, or weakened with light colored pigments or reflective layers.

The dark pigment melanin, for example, emphasizes the structurally induced impression of color by absorption of unneeded wavelengths, whereas a high level of reflection of the thermoplastic or photo-sensitive layer and/or adjacent layers leads to pastel shades. A high level of reflection can also hide the impression of color completely.

In the simplest case, such types of structural arrangements comprise a stack of thin transparent layers or else transparent patterns with air bubbles or with included particles as far as specially designed architectures of microscopic structures, such as photonic crystals, for example. The degree of ordering and the practical spatial arrangement determine the color and the angular dependence of the reflected electromagnetic radiation.

An angle-dependent impression of color is achieved by a periodic arrangement of areas with different refractive index (e.g. lattice structures or multiple layers of dielectric materials with different refractive index, which are arranged alternately with high and low refractive index). Interference of the light reflected at the various areas produces brilliant, shimmering colors, given in-phase superimposition (constructive interference).

However, constructive interference takes place for different wavelengths for different viewing angles, so that these hues change when observed from different directions. In this case, objects which are coated with these structures have an exact, clearly defined color but this color can be detected only in a narrow area in one direction (direction-dependent). While ordered structures interact with the light and the colors vary depending on the viewing angle, predominantly as a result of constructive interference, the structural colors on randomized structures are produced on account of the interaction of interference, diffraction and non-coherent scattering from a multiplicity of non-ordered structural units with ordered sub-structures.

Starting from the color-structure correlation from the FDTD simulations, the structure is changed into a compatible data format for lithography. Here, the level of randomization is also defined, wherein a distinction is to be drawn between the following types of randomization:

1) Randomization of the parameters of the structural geometry defined in the simulations, as a result of which a random deviation from the intended structure is achieved and thus a statistical distribution of similar structures is produced, which contributes to the directional independence of the impression of color.

2) Randomized distribution of the structures from 1) within a surface area (pixel).

3) Possibly randomized distribution of the pixels over a larger area (FIG. 4).

In a preferred embodiment, an area having randomized structures (pixels) which exhibits an angle-independent color effect is defined. The size of the pixels lies in the range from 1-500 µm, preferably 1-50 µm.

High-resolution images with angle-independent color effects can be produced from a plurality of such pixels with different colors.

To produce larger homogenous colored areas with the same color, the arrangement of same-color pixels can be randomized.

The non-periodic structures in the sub-micrometer range are produced with the aid of a suitable lithographic method (e.g. laser-based lithography, such as direct laser writing or laser interference lithography, electron beam lithography, focused ion beam (FIB) lithography, proton beam lithography, deep proton writing, etc) in a photo-sensitive material (photo-lacquer). These original structures are usually designated as "masters".

The security element according to the invention is advantageously produced by (3D) laser lithography or electron beam lithography.

As starting material for lithographic methods, first of all a suitable photosensitive or electron beam-sensitive lacquer (resist) is applied to a substrate. The resist is normally modified by photo-polymerization by the solubility being changed. By means of subsequent removal of the unexposed lacquer (in the case of a negative lacquer), a free-standing structure is produced. In the case of a positive lacquer, "holes" are produced following the removal of the unexposed material.

To produce the master, firstly a suitable substrate is cleaned. Suitable substrates are preferably glass, Si wafers and the like. The substrate is pre-cleaned with a suitable solvent, for example acetone and/or isopropanol. Likewise, oxygen plasma pre-treatment is suitable for some materials in order to produce smooth, uniform lacquer layers.

The resist is then either thrown on (by a spin coater) or dripped on for high structures which need a thick lacquer film.

However, it is also possible to apply the lacquer by printing, spreading on, roll application, immersion and the like.

According to the invention, in particular negative photo-resists, such as SU-8 (Microchem Corp), hybrid polymers such as Ormocer®, acrylate-based photo lacquers such as IP-L, IP-G, are suitable as resist layers. Some lacquers, such as SU-8, for example, demand thermal pre-treatment (pre-bake), in which the solvent of the lacquer is evaporated and the lacquer solidifies during cooling.

Other lacquers, such as IP-L, need no pre-treatment. Likewise suitable as lacquer layers, according to the invention, are positive photoresists, such as PMMA or photoresists based on acrylates, such as AZ®6615 (MicroChemicals GmbH, Germany).

Electron beam lithography (EBL) is a direct writing method for producing extremely high resolution structures in electron-beam-sensitive lacquers (resists) by means of focused electron beams. During the exposure, an accelerated electron beam, which is focused and positioned on the sample surface by electric and magnetic fields, strikes the resist surface and in the process changes the chemical structure thereof.

Laser lithography (LL) is a direct writing method with which, with the aid of a focused or unfocused laser beam, a local modification is brought about in a resist. The laser usually has a wavelength which lies in a suitable spectral absorption range of the resist. The laser can be operated continuously or in a pulsed manner. Pulse duration can lie in the femtosecond range to the nanosecond range. The modification caused by the laser can be of a physical and/or chemical nature, in which the resist is separated out or removed locally, or the solubility of the resist is influenced or optical properties such as refractive index or absorption coefficient are changed. Here, the laser beam is moved in a defined manner relative to the master with the aid of a suitable device, by which means a pattern (structure) is transferred (written) into the resist. The technical implementation of the device for the relative movement of the laser in relation to the target material can be present in the form of moved axes (translational, rotational) or in the form of a galvanometric scanner.

It is also possible for the laser to be fixed spatially and for the master to be mounted on a suitable movement unit.

Complex structures are preferably produced by means of 3D laser lithography.

3D laser lithography is a direct writing method in which, by means of a focused laser with a defined wavelength, which must not lie in the absorption range of the material to be structured, a structure is written into a photosensitive material. The difference from conventional laser writing methods by means of UV lasers is that the interaction between laser and material is based on a nonlinear optical process, multi-photon absorption.

Only as a result is it possible to produce 3D structures in one exposure step, since the modification of the material by the laser remains restricted to a small area around the focus. Advantages here are the absolute freedom and flexibility in the implementation of a model of a structure in a physical body, such as an embossing tool, and also the achievable high resolution, which is not limited by diffraction of the light. The production of a structure is carried out by means of defined movement of the laser focus through the material ("3D laser pen"), which thus writes the structure into the material.

The direct writing methods described are used for the production of a master structure for an embossing punch. Alternatively, it is also possible to use other mastering methods, such as phase transition mastering, for example, which are suitable for the production of nanostructures.

Further process steps follow, which produce from these structures an embossing tool which is compatible for large-area processing and which is ultimately used for color-imparting structural elements on flexible film substrates:

A) producing a master having structures with randomized sub-structures
B) if appropriate, by means of replicative duplication (multiple step-and-repeat processes), the master structure is expanded to a larger area (large-area master).

From the master or the large-area master, a so-called nickel shim is produced, for example by means of electroforming, and is subsequently used as an embossing tool for producing products having randomized structures.

The security element has a thermoplastic or photosensitive layer, which is possibly applied to a carrier substrate.

A surface of this layer is then structured with the embossing tool such that the randomized structures are transferred by forming.

In a preferred embodiment, the security features according to the invention are produced in a roll-based embossing process. Suitable methods are described, for example, in EP 1 310 381, to the content of which reference is hereby expressly made.

Suitable carrier substrates are, for example, carrier films, preferably flexible plastic films, for example of PI, PP, MOPP, PE, PPS, PEEK, PEK, PEI, PSU, PAEK, LCP, PEN, PBT, PET, PA, PC, COC, POM, ABS, PVC, PTFE, ETFE (ethylene tetrafluoroethylene), PFA (tetrafluoroethylene perfluoropropyl vinyl ether fluorocopolymer), MFA (tetrafluoromethylene perfluoropropyl vinyl ether fluorocopolymer), PTFE (polytetrafluoroethylene), PVF (polyvinyl fluoride), PVDF (polyvinylidene fluoride), and EFEP (ethylene tetrafluoroethylene hexafluoropropylene fluoroterpolymer).

The carrier films have a thickness of 5-700 µm, preferably 5-200 µm, particularly preferably 5-50 µm. Furthermore, metal foils, for example Al, Cu, Sn, Ni, Fe or stainless steel foils with a thickness of 5-200 µm, preferably 10 to 80 µm, particularly preferably 20-50 µm, can be used as a carrier substrate. The foils can also be surface-treated, coated or laminated, for example with plastics, or lacquered.

Furthermore, wood-free or wood-containing paper, thermally activatable paper or composites with paper, for example composites with plastics with a weight per unit area from 20-500 g/m$^2$, preferably 40-200 g/m$^2$, can be used as carrier substrates.

Furthermore, fabrics or nonwovens, such as continuous fiber nonwovens, staple fiber nonwovens and the like, which if appropriate can be needled or calendered, can be used as carrier substrates. Preferably, such fabrics or nonwovens consist of plastics, such as PP, PET, PA, PPS and the like, but fabrics or nonwovens made of natural, possibly treated, fibers such as viscose fibers can also be used. The nonwovens or fabrics used have a weight per unit area from about 20 g/m$^2$ to 500 g/m$^2$. If appropriate, the nonwovens or fabrics must be surface-treated.

In a further embodiment, the carrier substrate can itself represent the thermoplastic or photo-sensitive layer.

The structured surface of the thermoplastic or photosensitive layer can be provided with a reflective or light-absorbing metallization, an HRI or LRI layer or a colored layer, wherein the colored layer can be contrasting.

Furthermore, the non-periodic randomized structures according to the invention on a security element can also be combined with further functional layers which, for example, exhibit magnetic, electrically conductive, physical, optical, optically active or optically variable properties.

Layers which contain paramagnetic, diamagnetic and also ferromagnetic substances, such as iron, nickel and cobalt or their alloys, compounds or salts (for example oxides or sulfides), barium or cobalt ferrites, hard and soft magnetic iron and steel grades, can be used as layers with magnetic properties.

The optical properties of the layer can be influenced by visible colorants or pigments, luminescent dyes or pigments, which fluoresce or phosphoresce in the visible range, in the UV range or in the IR range, effect pigments such as liquid crystals, pearlescents, bronzes and/or multilayer color-changing pigments and heat-sensitive colors and pigments. These can be used individually or in all possible combinations.

Layers which contain graphite, carbon black, conductive organic or inorganic polymers, metal pigments (for example copper, aluminum, silver, gold, iron, chromium and the like), metal alloys such as copper-zinc or copper-aluminum or else amorphous or crystalline ceramic pigments such as ITO and ATO, doped or non-doped semiconductors such as silicon, geranium, for example, or ion conductors such as amorphous or crystalline metal oxides or metal sulfides, can be used as electrically conductive layers.

Optically active structures are, for example, diffractive structures, diffraction structures, surface reliefs, holograms, kinegrams and the like.

Optically variable layers are understood to be layers which exhibit a color effect dependent on the viewing angle, for example a color-shift effect or a color tilting effect.

Examples thereof are thin-layer elements, interference elements, Fabry-Perot filters and the like.

The security elements according to the invention are suitable for application in or on identity papers, cards, banknotes or labels, seals and the like but also as packaging material, for example in the pharmaceutical, electronics and/or food industry, for example in the form of blister films, folding boxes, coverings, film packaging materials and the like.

For the application as security elements, the substrates or film materials are preferably cut into strips, threads or patches, wherein the width of the strips or threads can preferably be 0.5-20 mm and the patches preferably have average widths and lengths of 0.3-20 mm.

Here, the security elements can be at least partly embedded or applied.

For the application in or on packaging materials, the film material is preferably cut into strips, tapes, threads or patches, wherein the width of the threads, strips or tapes is preferably 0.5-50 mm and the patches preferably have average widths and lengths of 2-30 mm.

EXAMPLE 1

The laser lithography for the sub-micrometer master structures is carried out with the "Photonic Professional" (Nanoscribe GmbH, Germany). The system is equipped with a fiber laser (wavelength 780 nm, pulse duration 150 fs, repetition rate 100 MHz, mean output power <90 mW). The sample can be positioned relative to the laser focus coarsely via a two-axis motor stage (Marzhauser, Germany) or highly accurately via a three-axis piezoelectric unit (PI, Germany).

This system has an autofocus unit for automatically finding the interface between photoresist and substrate and a camera system for online monitoring of the writing process and for finding any registration marks. The laser is focused via an inverted microscope (Zeiss, Germany) which is equipped with multiple objectives. For the high-resolution color-imparting structures, the 100× oil immersion objective with a numerical aperture of NA=1.4 is used as standard. In general, the master structures are written into positive photo lacquers (AZ-6615, AZ-1505, MicroChemicals GmbH, Germany) and developed with AZ 726 MIF (MicroChemicals GmbH, Germany), by which means exposed material is removed.

The structure itself comprises small (<1 µm) lens-like structures made of photoresist, which are distributed in randomized form over an area. The principle of the randomization is based on a regular lattice (lattice constant a). Each point of the lattice is offset from its original lattice position by a random amount (0 to a) and a random angle (0 to 360°). This produces a completely randomized lattice within a pixel of defined size.

Figure 6:
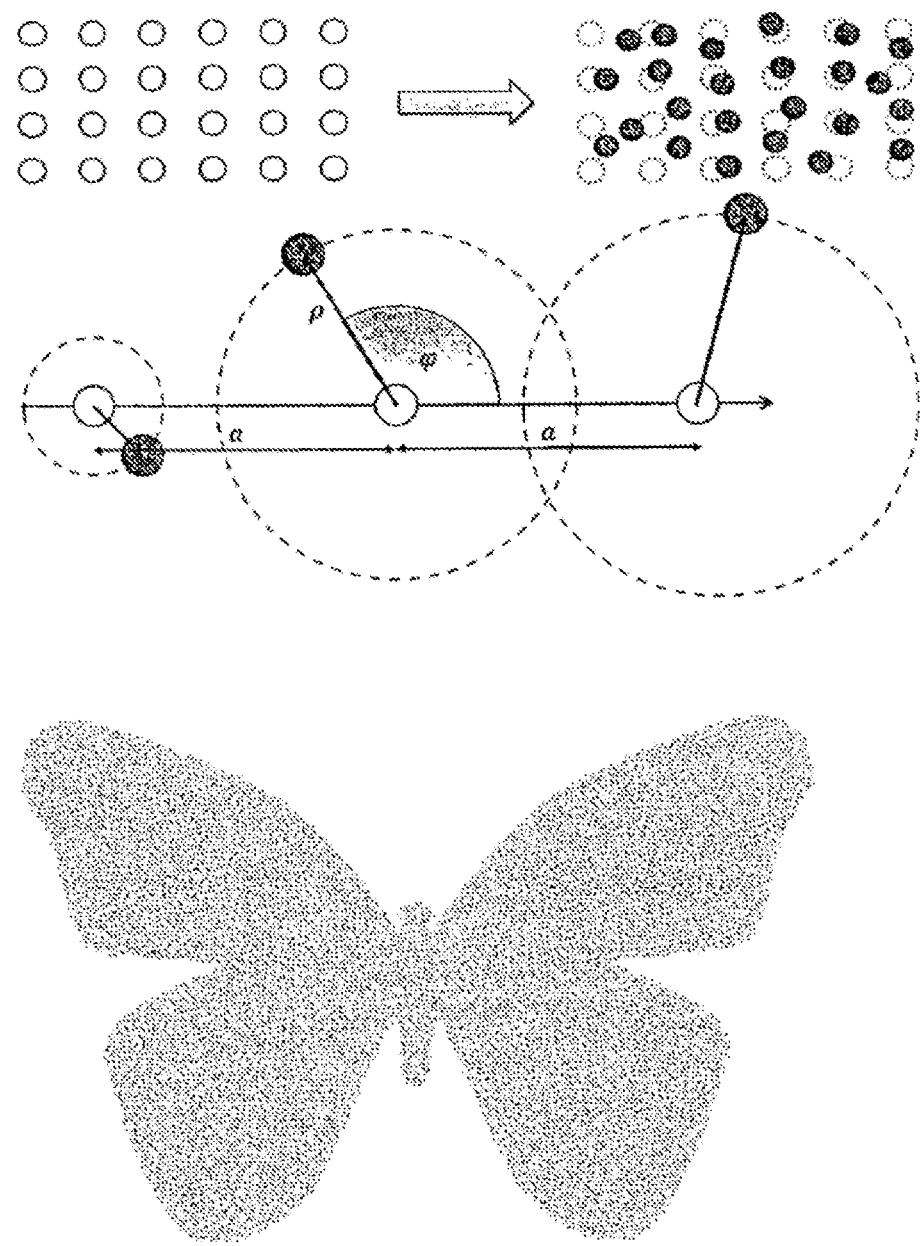

This pixel is then replicated over a larger area and shape (e.g. butterfly) (FIG. 6). The lens-like structures are produced at the randomized positions with the aid of the laser by means of point exposures. The dose for the laser exposure for the photoresists used is typically in the range 20-350 mJ/cm$^2$. By means of additional random variation of the exposure dose within the suitable area, besides the position, the diameter and the height (in general magnitude) for each individual lens-like structure can also be randomized in order to achieve a maximum of non-coherent light scattering.

EXAMPLE 2

The structures from example 1 can be produced in the same way by means of electron beam lithography, wherein the individual lens-like structures have a typical size of 50-500 nm and PMMA is used as positive photoresist.

The exposure dose then lies in the range 190-240 µC/cm$^2$.

The invention claimed is:

1. A security element comprising a thermoplastic or photosensitive layer, wherein a surface of the layer comprises non-periodic randomly arranged (randomized) structures in a sub-micrometer range to produce an impression of color, wherein the non-periodic randomly arranged structures are small tree structures comprising individual structural units and are randomized based on a correlation obtained between the individual structural units and spacing between individual structural units, and spectral reflective behavior using wave-optical finite-difference-time-domain (FDTD) simulations, and a random deviation from an intended structure is achieved and a statistical distribution of similar structures is produced, which contributes to a directional independence of the impression of color.

2. The security element as claimed in claim 1, wherein the non-periodic randomly arranged (randomized) structures are produced by lithographic methods.

3. The security element as claimed in claim 1, wherein the impression of color is intensified by combination with a light absorber, black metallization or a colored layer.

4. The security element as claimed in claim 1, wherein the impression of color is weakened by combination with a light pigment, a reflective pigment, a full-area reflecting metal layer, a partially reflecting metal layer or a colored layer.

5. The security element as claimed claim 1, wherein an area having randomized structures (pixels) is defined and a multi-color image having angle-independent color effects is produced from a plurality of the pixels with different colors.

6. The security element as claimed in claim 1, wherein an area having randomized structures (pixels) is defined and a larger same-color colored area is produced by randomized same-color pixels.

7. The security element as claimed in claim 1, further comprising at least one security feature selected from the group consisting of an electrically conductive property, a magnetic property, an optical property, an optically active property and an optically variable property.

8. A method for producing the security element as claimed in claim 1, comprising the following method steps:
   a) producing a master comprising structures with randomized sub-structures;
   b) replicative duplication (multiple step-and-repeat processes) of the master structure to produce an embossing tool with randomized structures;
   c) molding the randomized structures of the embossing tool in a surface of a thermoplastic or photosensitive layer; and
   d) optionally applying further functional layers or tailoring.

9. A method of using the security element as claimed in claim 1, comprising applying the security element in or on an identity paper, a card, a banknote, a label, a seal or a packaging material in the form of a blister film, a folding box, a covering or a film packaging material.

10. The security element as claimed in claim 1, wherein the impression of color is selected from the group consisting of white, blue, red, green, yellow and purple.

11. The security element as claimed in claim 3, wherein the light absorber is a full-area light absorber or a partial light absorber.

12. The method as claimed in claim 9, wherein the packaging material is selected from the group consisting of a pharmaceutical industry package, an electronics industry package and a food industry package.

\* \* \* \* \*